2,717,206

METHOD FOR PREPARATION OF LEAD-SODIUM ALLOYS

Hymin Shapiro, Detroit, Mich., assignor to Ethyl Corporation, New York, N. Y., a corporation of Delaware No Drawing. Application November 27, 1951, Serial No. 258,529

3 Claims. (Cl. 75—167)

This invention relates to the production of active alloys. In particular my invention relates to the manufacture of active alloys of lead.

Among the objects of the present invention is the provision of novel alloys which have a high degree of chemical activity, as well as methods for their preparation and use.

The above as well as additional objects of the present invention will be more particularly understood from the following description of several of its exemplifications.

According to my invention active alloys of sodium and another metal are formed by mixing a quantity of alkali metal hydride with the alloying metal; and heating the mixture to a temperature at which the alkali metal hydride reacts with the alloying metal to form the alloy.

The reaction appears to take place in the following manner, wherein sodium hydride is employed in a typical embodiment

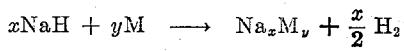

$$x\text{NaH} + y\text{M} \longrightarrow \text{Na}_x\text{M}_y + \frac{x}{2}\text{H}_2$$

In the above equation M is the alloying metal, and $x$ and $y$ are small numbers.

Although the process is generally accompanied by the liberation of heat, heating is necessary to the commencement of the reaction, and temperatures of the order of 300° C. or higher are effective for this purpose. Once the reaction gets under way, the application of heat can be reduced or entirely terminated, and in vigorous cases the reaction mixture may even have to be cooled to keep the process under control. The process is applicable generally to manufacture of the alloys of an alkali metal with a group IV–A metal, i. e., lead, tin or germanium.

Although the present invention can be used to make any alkali metal alloys, it is particularly effective in the manufacture of sodium-lead alloys. Such alloys are widely used in the manufacture of alkyllead compounds, the most important of which is tetraethyl lead, the well-known anti-knock agent.

Sodium-lead alloys of any formulation having more than about 5% lead by weight can be prepared in accordance with the present invention. In particular, my process is advantageous in preparing alloys of sodium and lead containing between about 8 and 31 weight per cent sodium.

A typical embodiment of the process of my invention was conducted as follows: A standard ethylation of sodium-lead alloy was conducted wherein monosodium-lead alloy was treated at a temperature of 75 to 80° C. with ethyl chloride for a period of three hours. At the end of this time the reaction mixture after cooling to a temperature of 25° C. was introduced to a distillation vessel containing water and the tetraethyllead was recovered therefrom by steam distillation. Upon introduction of the above reaction mixture to the water, the sodium chloride dissolved and after completion of the steam distillation a solid residue of finely divided lead remained. This lead was recovered by settling and decantation and dried at a temperature of 100° C. To 100 parts of this finely divided lead was added 11.6 parts of sodium hydride. The mixture was heated to a temperature of 300° C. and the hydrogen produced during reaction was removed by venting. After approximately one-half hour at a temperature of 300° C. the reaction vessel was cooled and the contents were comminuted by grinding to provide a granular alloy corresponding to NaPb.

Similarly, when 100 parts of lead is treated as above with 23.2, 26.1, 28.9 and 46.3 parts of sodium hydride, excellent yields of alloys of sodium and lead containing 18.2, 20.0, 21.7 and 30.7 weight per cent sodium are obtained in a chemically active condition. Likewise alloys intermediate of the above compositions can be similarly obtained. In general I prefer to employ between about 11 and 25 parts of sodium hydride per 100 parts of lead. Other alkali metal alloys can be prepared as in the foregoing example. For example alloys of potassium and lead, sodium and germanium, lithium and lead and the like can be provided by treating potassium hydride with lead, sodium hydride with germanium or lithium hydride with lead respectively and obtain as product active forms of such alloys.

The NaPb alloy prepared as in the foregoing example is conveniently alkylated by adding to 100 parts of the alloy a charge of 70 parts by weight of ethyl chloride in a sealed reaction vessel. The reaction mixture was heated to about 80° C. The pressure is kept high enough to keep the ethyl chloride in liquid form and the ethyl chloride is advantageously added gradually during the heating in order for part to react before the total amount is added. After about 30 to 40 minutes contact with the ethyl chloride at 85° C., the container is permitted to cool to room temperature, the excess ethyl chloride vented off and the residue then poured into water and steam distilled to remove the tetraethyl lead in the standard manner.

About the same improvements are obtained with the alloying reaction carried out with finely divided lead in the form of lead turnings or lead shot or ground lead particles.

Where the metal being alloyed with the alkali metal melts at a temperature lower than the desired alloy, as is the case with lead, the alloying treatment of the present invention can be effected at temperatures above this melting point to partially or completely liquify the alloying metal. This is preferably effected with mechanical agitation to assure proper mixing of the liquid with the sodium hydride. The liberation of hydrogen gas during the reaction, combined with the conversion of the liquid metal to solid alloy assures the proper activity.

It is within the scope of my invention to produce alloys containing minor proportions of a third metal. For example an improved process for manufacture of tetraethyllead comprises ethylating a sodium-lead alloy and minor proportions of potassium. I can provide active alloys of this type by my process by incorporating metallic potassium in the reaction mixture of sodium hydride and lead or by initially producing a mixed hydride of sodium and potassium in the desired proportions and treating this mixture with lead metal as in the above typical example. Similarly, if it is desired to incorporate magnesium metal in the sodium-lead alloy, this can be advantageously done by incorporating powdered magnesium in the reaction mixture of alkali metal hydride and lead.

Although I do not intend to be bound by any theory as to the mechanism by which my process produces active alloys, I believe that the presence of hydrogen evolved during the process of forming the alloy prevents corrosion or oxidation of the alloy surface. By this means I believe that a chemically clean alloy surface is provided. An alternative explanation may reside in the adsorption on the alloy surface of hydrogen which causes the activity of the final alloy.

The present invention can also be used to prepare alloys of alkali metal with other metals such as tin, germanium, silicon, mercury and the like. These metals react in the same manner shown above for lead. In general, depending on the alloying metal and the melting point of the alloy, I employ temperatures between about 125° C. and 550° C., although I prefer to employ temperatures between about 250° C. and 400° C.

The alkylation of sodium-lead alloys of my invention can also be effected with other alkylating agents such as methyl chloride, isopropyl chloride, n-propyl chloride, butyl chloride, amyl chlorides, phenyl bromide and the like. In addition, the corresponding alkyl sulfates and phosphates either having duplicate or mixed alkyl groups can also be used to alkylate the alloys made as described above. Additives such as the well-known iodine type catalysts (U. S. Patent No. 2,414,058), ether catalysts or tertiary amine catalysts (U. S. Patent No. 2,535,192) or carbonyl catalysts such as acetone are also suitable for use during the alkylation of the present invention and further improve its results.

As many apparently widely different embodiments of this invention may be made without departing from the spirit and scope hereof, it is to be understood that the invention is not limited to the specific embodiments hereof, except as defined in the appended claims.

I claim:

1. A method of converting the lead of finely divided predominantly lead residues from a tetraalkyllead process to sodium lead alloy comprising mixing sodium hydride with said finely divided lead in the proportion of about 11.6 parts by weight to 100 parts by weight of lead, then heating to a temperature of from about 250° C. to 400° C. for a time sufficient to convert the lead to sodium lead alloy.

2. The process of claim 1 further defined in that the temperature is about 300° C.

3. The process of claim 2 further defined in that heating is continued for approximately one-half hour.

References Cited in the file of this patent

UNITED STATES PATENTS

| | | |
|---|---|---|
| 1,732,326 | Cooper | Oct. 22, 1929 |
| 2,038,402 | Alexander | Apr. 21, 1936 |
| 2,109,005 | Bake | Feb. 22, 1938 |
| 2,163,224 | Alexander | June 20, 1939 |
| 2,362,007 | Hensel et al. | Nov. 7, 1944 |

OTHER REFERENCES

Mellor, J. W., "Comprehensive Treatise on Inorganic and Theoretical Chemistry," London, vol. 2, page 484, 1923.

Metal Hydrides, Bulletin 507-A on Sodium Hydride, published by Metal Hydrides, Beverly, Mass., 7 pages. (Received in U. S. Patent Office February 15, 1950.)